(12) United States Patent
Mishina et al.

(10) Patent No.: US 8,256,100 B2
(45) Date of Patent: Sep. 4, 2012

(54) STATOR MANUFACTURING APPARATUS

(75) Inventors: Tokuhisa Mishina, Anjo (JP); Shingo Hashimoto, Okazaki (JP); Masaki Saito, Okazaki (JP)

(73) Assignee: Aisin AW Co., Ltd., Anjo-Shi (JP)

( * ) Notice: Subject to any disclaimer, the term of this patent is extended or adjusted under 35 U.S.C. 154(b) by 141 days.

(21) Appl. No.: 12/719,906

(22) Filed: Mar. 9, 2010

(65) Prior Publication Data

US 2010/0236059 A1 Sep. 23, 2010

(30) Foreign Application Priority Data

Mar. 23, 2009 (JP) ................................ 2009-070995

(51) Int. Cl.
*B23P 19/00* (2006.01)
(52) U.S. Cl. .............. 29/732; 29/734; 29/736; 29/596
(58) Field of Classification Search ............ 29/596–598, 29/732–736, 564.4–564.6; 242/433
See application file for complete search history.

(56) References Cited

U.S. PATENT DOCUMENTS

| 3,402,462 A | * | 9/1968 | Hill et al. ....................... | 29/596 |
| 3,815,206 A | * | 6/1974 | Smith ............................. | 29/606 |
| 3,949,464 A | * | 4/1976 | Walker ........................... | 29/596 |
| 4,276,689 A | * | 7/1981 | Urick et al. .................... | 29/596 |
| 4,538,349 A | | 9/1985 | Nakamura | |
| 5,237,740 A | * | 8/1993 | Hayashi et al. ................ | 29/734 |
| 5,802,706 A | * | 9/1998 | Barrett ........................... | 29/736 |
| 2004/0207283 A1 | | 10/2004 | Oohashi et al. | |

FOREIGN PATENT DOCUMENTS

| JP | 59-032343 A | 2/1984 |
| JP | 2003-088021 A | 3/2003 |
| JP | 2003-153478 A | 5/2003 |

* cited by examiner

*Primary Examiner* — Minh Trinh
(74) *Attorney, Agent, or Firm* — Sughrue Mion, PLLC

(57) ABSTRACT

An stator manufacturing apparatus including an substantially cylindrically-shaped insertion jig from which the rectangular wire is axially detachable, and having protrusions respectively provided at positions aligned with the slots on an outer peripheral surface thereof to protrude radially, and one end-side restricting members respectively provided at positions offset from the protrusions formed in the circumferential direction on an inner diameter side of an inscribed circle of teeth each located between adjacent ones of the slots so as to protrude toward one axial end side. With the linear portions and the slots being aligned with each other, the insertion jig is inserted into the stator core from the one end side of the insertion jig, and is removed from the stator core toward the other end side, so as to respectively dispose the linear portions at predetermined positions in the slots.

3 Claims, 15 Drawing Sheets

F I G. 5A
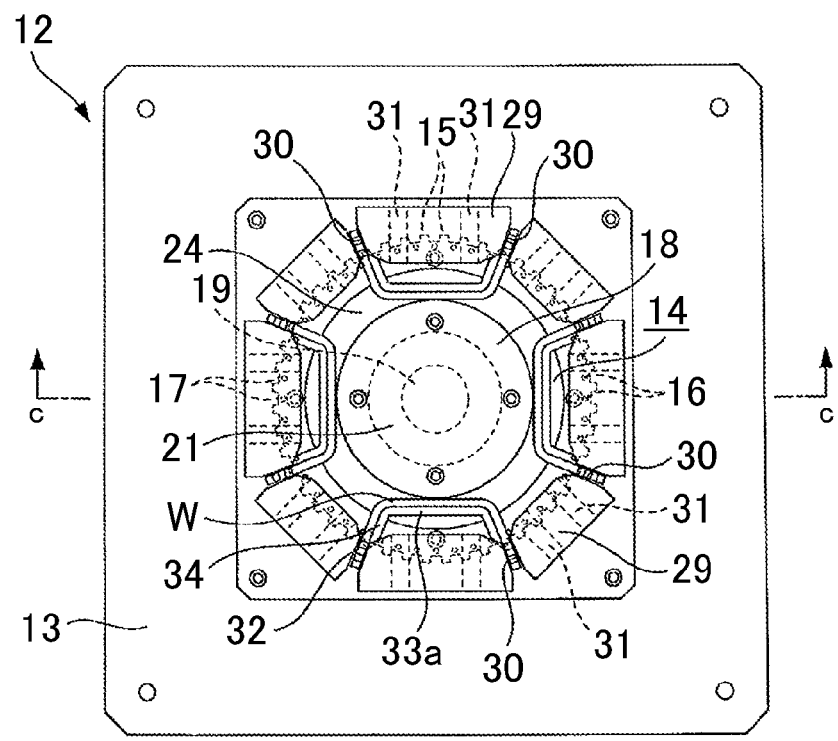
F I G. 5B
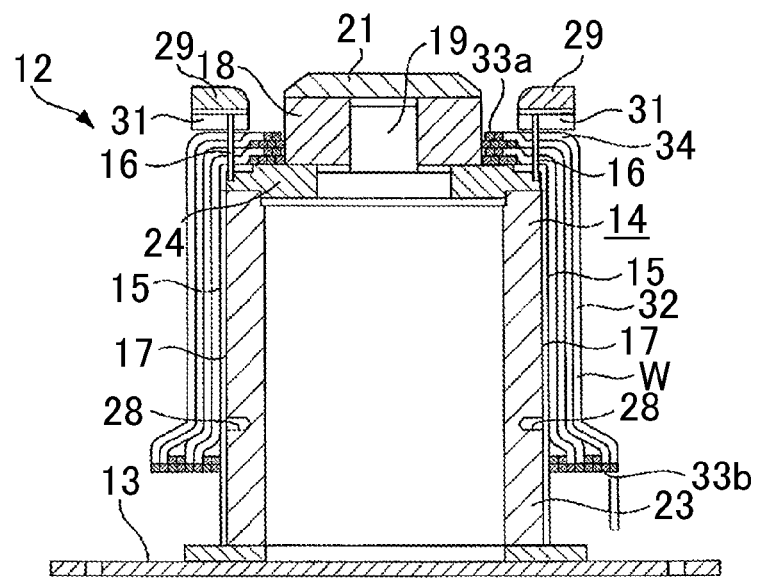

F I G. 10
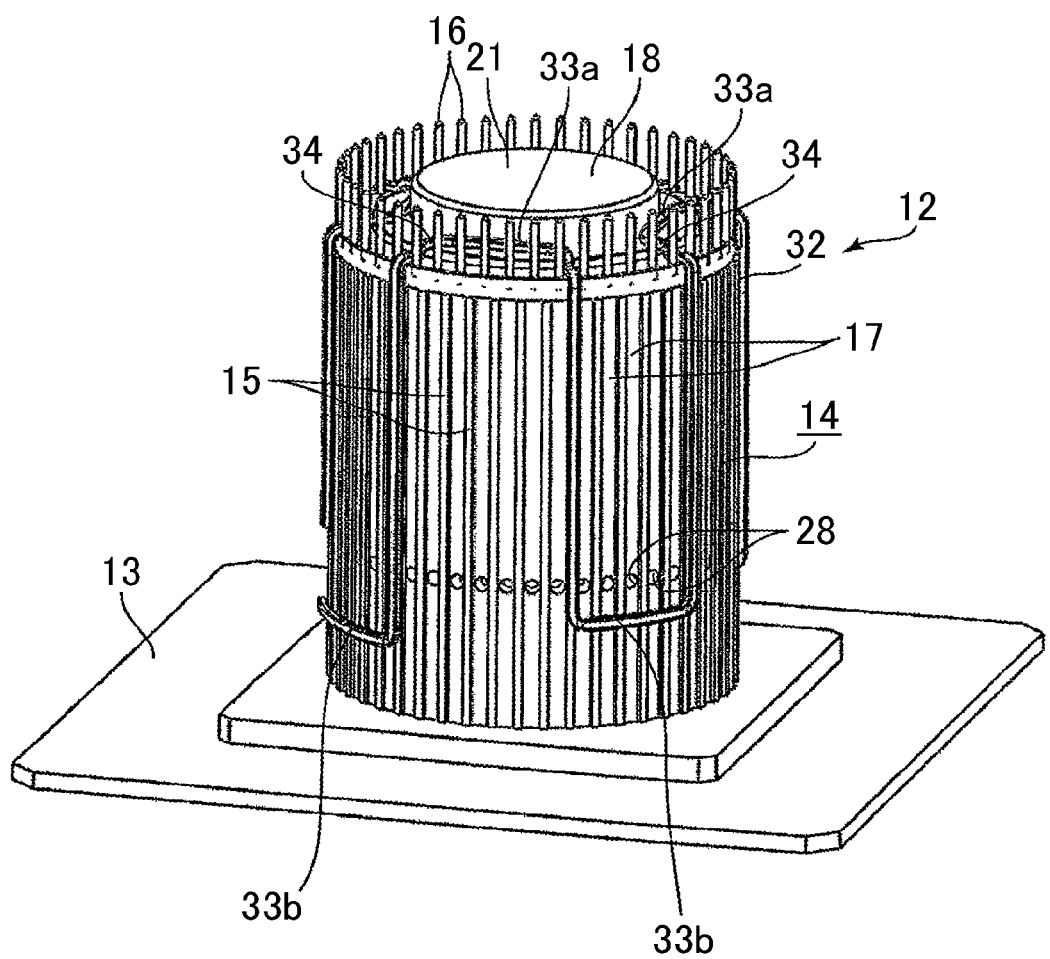

F I G . 15
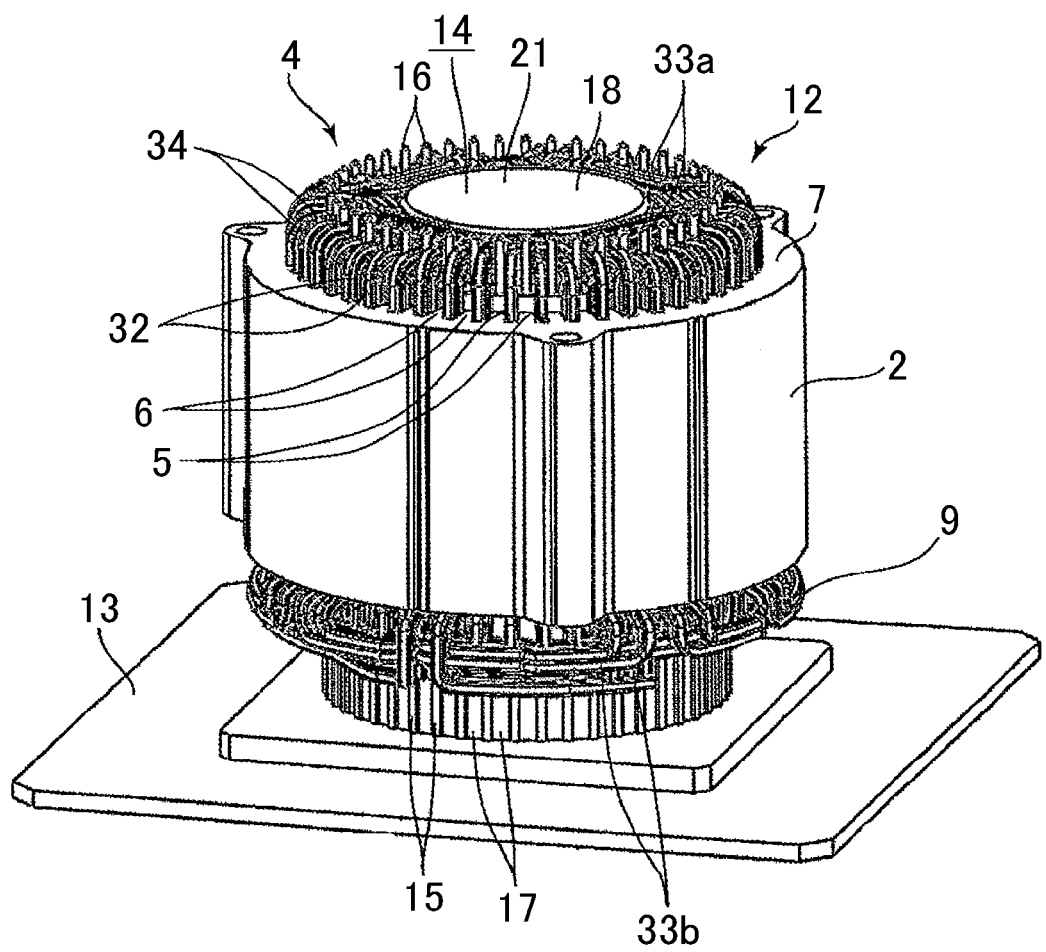

STATOR MANUFACTURING APPARATUS

INCORPORATION BY REFERENCE

The disclosure of Japanese Patent Application No. 2009-070995 filed on Mar. 23, 2009 including the specification, drawings and abstract is incorporated herein by reference in its entirety.

BACKGROUND OF THE INVENTION

The present invention relates to apparatuses for manufacturing a stator for rotating electrical machines, and more particularly, to apparatuses for manufacturing a stator by disposing rectangular wires, which have a rectangular cross section and form coil windings (magnet wires), in a stator core in a distributed winding arrangement.

DESCRIPTION OF THE RELATED ART

In general, rotating electrical machines, such as induction motors and direct current (DC) motors (including generators), have been widely used as industrial or vehicular power sources, and a distributed winding arrangement having a high specific output has been generally used as the coil layout of the stators. In recent years, due to output and dimensional requirements and the like, it has been proposed to use rectangular wires, which have a high space factor in the slots, as magnet wires in motors for hybrid drive vehicles and electric vehicles.

In the case where a stator is formed by disposing a coil in a stator core, a part of the coil is disposed in radial slots, which are formed at a plurality of positions of the stator core in a circumferential direction. In a known structure using a concentrated winding arrangement as the coil layout, a coil is formed in advance according to the slot shape, the formed coil is axially inserted into a stator core, and then, an end of the coil is bent into a predetermined shape (see Japanese Patent Application Publication No. JP-A-2003-153478).

SUMMARY OF THE INVENTION

The invention described in Japanese Patent Application Publication No. JP-A-2003-153478 is a method for disposing the concentrated winding coil in the stator core, and it is difficult to apply this method to disposing of the distributed winding coil. That is, the distributed winding coil is made of metal wires each having a plurality of linear portions, and a plurality of continuous portions, which alternately connect one ends of adjacent ones of the linear portions to each other and the other ends thereof to each other. A stator is formed by disposing the plurality of linear portions in the slots. On the other hand, the concentrated winding coil is formed by merely disposing the linear portions of two locations in the slots. The structure of the concentrated winding coil is thus significantly different from that of the distributed winding coil in which the linear portions are disposed in a plurality of slots. Thus, it is not easy to apply a method for disposing the concentrated winding coil to the distributed winding coil.

In particular, when rectangular wires having a rectangular cross section are used as the metal wires that form the coil, it is more difficult to dispose the rectangular wires in the stator core as compared to round wires having a circular cross section, due to the directionality of the rectangular wires when inserted into the slots. That is, the rectangular wires need to be inserted into the slots while keeping the side surfaces of the rectangular wires and the inner side surfaces of the slots parallel to each other. Thus, it is difficult to dispose the rectangular wires in the slots in the distributed winding arrangement, because the directionality of the rectangular wire needs to be considered. On the other hand, the round wires have no directionality, and thus, can be disposed in the slots while being freely deformed. Thus, it is not so difficult to dispose the round wires in the slots as it is in the case of the rectangular wires.

Moreover, the coil can be manually disposed in the stator core in a distributed winding arrangement. More specifically, each linear portion is sequentially inserted into the slots in the radial direction while elastically deforming the continuous portions, and the coil in the distributed winding arrangement is disposed in the stator core by repeating this operation. However, this is time-consuming and increases the manufacturing cost.

Moreover, it is difficult to form a coil in advance in the distributed winding shape, and then manually dispose the linear portions in the stator core in a radial direction, because the linear portions are elastically deformed to a large extent. In particular, when the coil is formed by rectangular wires, the coil is not easily elastically deformed due to high rigidity of the rectangular wires. One ends of the linear portions may be bent radially inward in order to reduce the axial dimension of the coil. In this structure, however, it is more difficult to manually dispose the coil in the stator coil in the manner described above, because it is difficult to elastically deform the coil due to the presence of the bent portions.

It is an object of the present invention to provide a stator manufacturing apparatus by which a rectangular wire that forms a coil can be easily disposed in a stator core in a distributed winding arrangement.

A stator manufacturing apparatus according to a first aspect of the present invention for manufacturing a stator that includes: a stator core having radial slots, which are formed at a plurality of positions in a circumferential direction so as to open in an inner peripheral surface of the stator core; and a rectangular cross-section rectangular wire that is formed in a substantially cylindrical shape and forms a coil winding, and that has a plurality of linear portions that are respectively disposed in the slots and formed parallel to the slots, a plurality of continuous portions that alternately connect one ends of adjacent ones of the linear portions and the other ends thereof to each other, and a plurality of bent portions that are formed by bending one end side of the linear portions radially inward, wherein the rectangular wire is disposed on the stator core in a distributed winding arrangement, is characterized by including: an insertion jig which is entirely formed in a substantially cylindrical shape, and from which the rectangular wire is axially detachable. In the stator manufacturing apparatus, the insertion jig has protrusions that are respectively provided at a plurality of positions, which are aligned with the slots, on an outer peripheral surface of the insertion jig so as to protrude radially, and one end-side restricting members that are respectively provided at positions offset from the protrusions formed in the circumferential direction on an inner diameter side of an inscribed circle of teeth each located between adjacent ones of the slots of the stator core so as to protrude toward one axial end side. Radial positions of the linear portions are restricted by disposing the rectangular wire from one end side of the insertion jig and disposing the linear portions so as to radially overlap the protrusions, respectively, and circumferential positions of the linear portions are restricted by disposing each of the bent portions between the one end-side restricting members. With the linear portions and the slots being aligned with each other, the insertion jig is inserted into the stator core from the one end side of the insertion jig, and is removed from the stator core toward the other end side, so as to respectively dispose the linear portions at predetermined positions in the slots.

According to a second aspect of the present invention, the insertion jig may include other end-side restricting members, which are detachably provided at positions offset from the protrusions on an outer peripheral surface of the other axial end side of the insertion jig so as to protrude radially, and after the rectangular wire is disposed on the insertion jig, the other end-side restricting members may be attached to the insertion jig, the insertion jig may be inserted into the stator core with the respective circumferential positions on the other end side of the linear portions being restricted by the other end-side restricting members, the other end-side restricting members may be removed from the insertion jig, and then, the insertion jig may be removed from the stator core.

According to a third aspect of the present invention, the stator manufacturing apparatus may further include a guide member provided on one axial end side of the insertion jig so as to guide each of the linear portions to a predetermined one of the protrusions, and guide each of the bent portions between predetermined ones of the one end-side restricting members.

According to the invention of the first aspect, the insertion jig is axially inserted into the stator core after the rectangular wires are disposed on the insertion jig in the distributed winding arrangement. Thus, the rectangular wires can be easily disposed in the stator core in the distributed winding arrangement. In particular, the rectangular wires have directionality, and the rectangular wires can be placed only in a limited direction. Thus, the directionality of the linear portions can be easily determined by placing the linear portions on the protrusions. Moreover, by restricting the radial positions of the linear portions by the protrusions, the linear portions can be easily disposed at predetermined positions of the slots without protruding in the radial direction. Moreover, by using the bent portions, the circumferential positions of the linear portions can be easily restricted by the one end-side restricting members. Moreover, since the bent portions are bent radially inward, the rectangular wires can be disposed in the stator core without interfering with the rectangular wires, by inserting the insertion jig from the one axial end where the bent portions are present.

According to the invention of the second aspect, the circumferential positions on the other end side of the linear portions are restricted by the other end-side restricting members. Thus, the circumferential positions of the linear portions can be more reliably restricted along the axial direction, and the linear portions and the slots of the stator core can be prevented from interfering with each other when inserting the insertion jig into the stator core, thereby enabling smooth insertion. Moreover, since the other end-side restricting members are removed when removing the insertion jig, the continuous portions on the other end side of the rectangular wires do not interfere with the other end-side restricting members.

According to the invention of the third aspect, since the linear portions and the bent portions are guided to predetermined positions by the guide members, the rectangular wires can be easily and reliably disposed on the insertion jig.

BRIEF DESCRIPTION OF THE DRAWINGS

FIGS. 5A and 5B shows a plan view and a c-c sectional view, showing the state where a coil is disposed in the structure shown in FIGS. 4A and 4B;
FIG. 10 is a perspective view showing a fourth step of the process;
FIG. 15 is a perspective view showing a ninth step of the process.

DETAILED DESCRIPTION OF THE EMBODIMENTS

Figure 1:
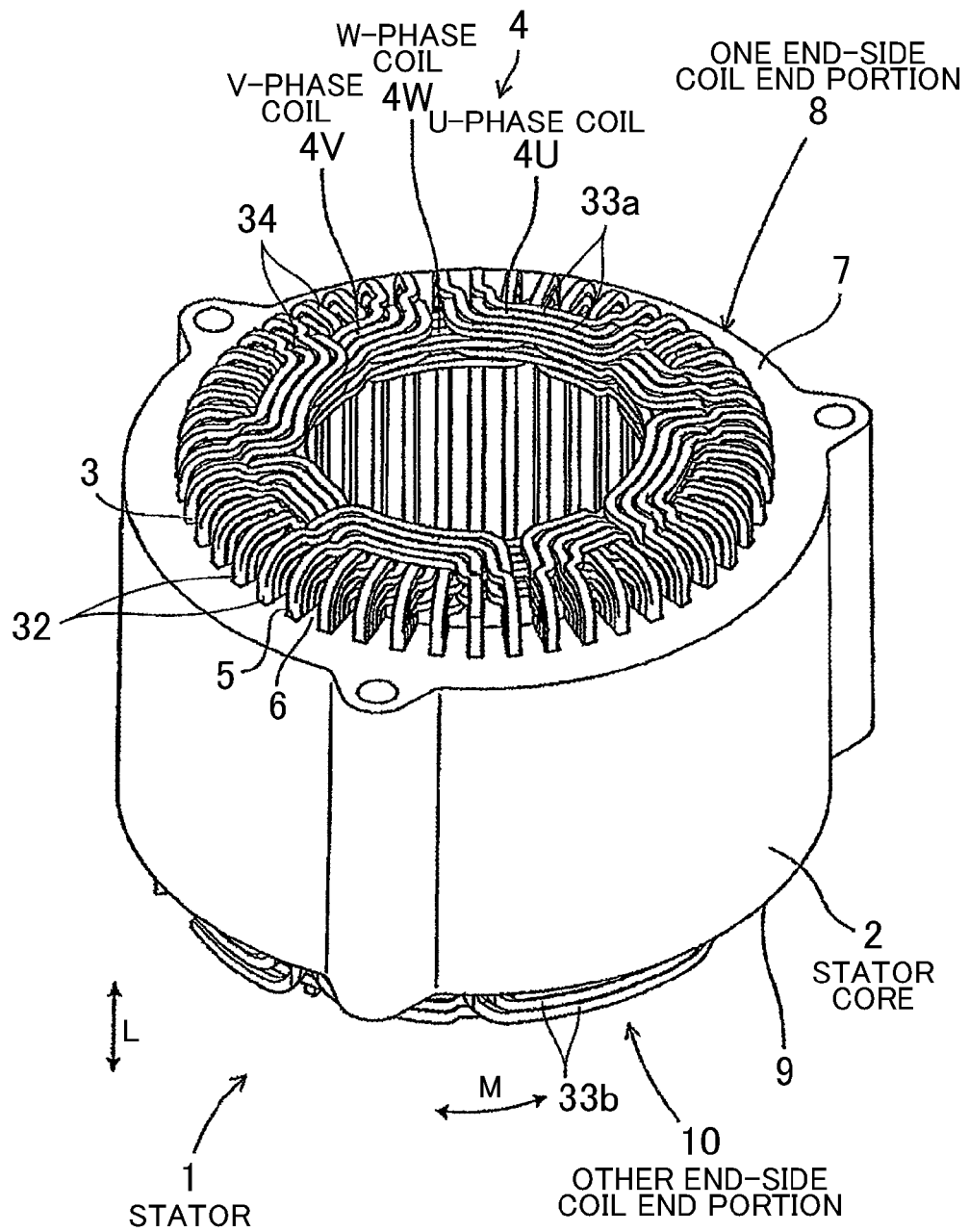
FIG. 1 is a perspective view showing a stator that is manufactured according to the present invention.

An embodiment of the present invention will be described below with reference to the accompanying drawings. First, an example of a stator for rotating electrical machines (such as a motor and a generator), which is manufactured by a stator manufacturing apparatus of the present invention, will be described with reference to FIGS. 1 and 2. A stator 1 forms, together with a rotor, an electric motor (including a generator), and the electric motor is preferably used as an electric motor (including a generator), especially a brushless direct-current (DC) motor, which serves as a driving source of electric vehicles and hybrid vehicles. As shown in FIG. 1, the stator 1 is formed by a stator core 2 and a coil 4, where the stator core 2 is formed by stacking a multiplicity of thin silicon steel plates, and the coil 4 is formed by winding magnet wires 3 (conductors, windings) made of a predetermined material. The stator core 2 has a ring shape, and a multiplicity of slots 5, which are open toward the inner diameter side, and a multiplicity of teeth 6 are alternately formed in the stator core 2. Each of the three-phase coils 4, which are U-phase, V-phase, and W-phase coils 4 (4U, 4V, 4W), is wound in a distributed winding arrangement between corresponding two of the slots 5 arranged at a predetermined pitch.

The magnet wires 3 are made of rectangular wires having a rectangular cross section. The magnet wires 3 have an insulating coating film, such as an insulating resin, formed on the entire circumference of conductor portions made of copper or the like. The three-phase coils 4U, 4V, and 4W formed by the wires 3 are disposed as follows. In the slots 5 of the same phase, a plurality of (e.g., four) wires 3 of the same phase are disposed adjacent to each other in a radial direction of the stator core 2. In a one end-side coil end portion 8 that protrudes from one end face 7 in an axial direction L of the stator core 2 (the upper end face in FIG. 1), a plurality of wires 3 of the same phase are bent radially toward the inner diameter of the stator core 2, and are disposed adjacent to each other in the radial direction of the stator core 2. In the other end-side coil end portion 10 that protrudes from the other end face 9 in the axial direction L of the stator core 2 (the lower end face in FIG. 1), a plurality of wires 3 of the same phase are disposed adjacent to each other in the radial direction (or the axial direction) of the stator core 2.

Figure 2:
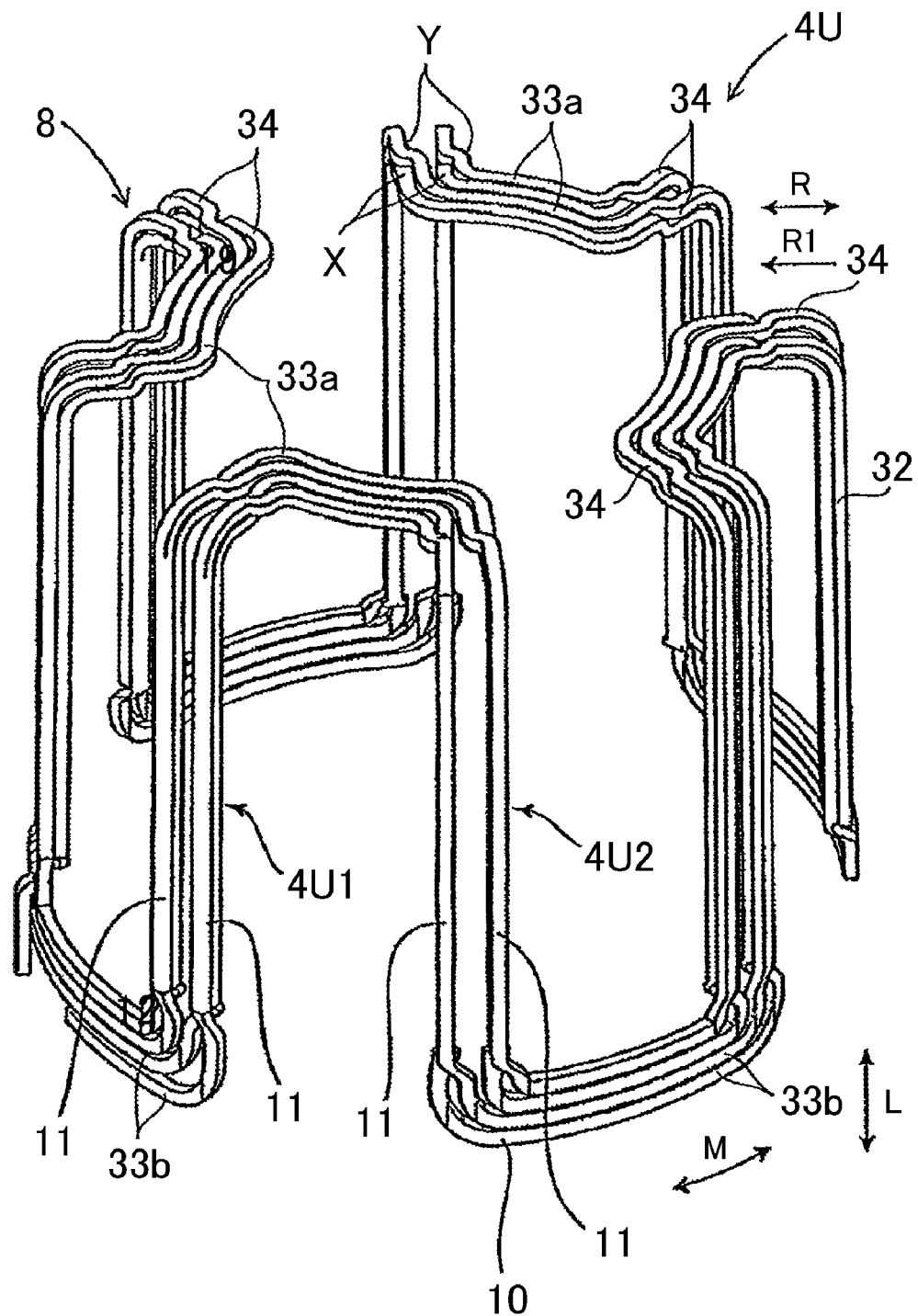
FIG. 2 is a perspective view showing a coil (U-phase)
Figure 3A:
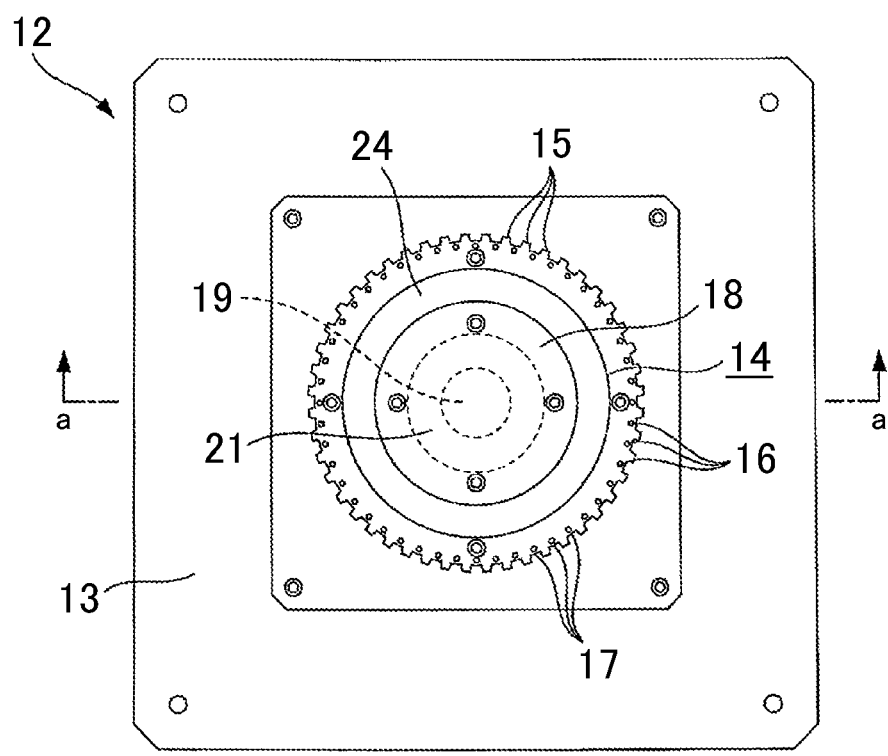
FIGS. 3A and 3B show a plan view and an a-a sectional view of a stator manufacturing apparatus according to an embodiment of the present invention.
Figure 3B:
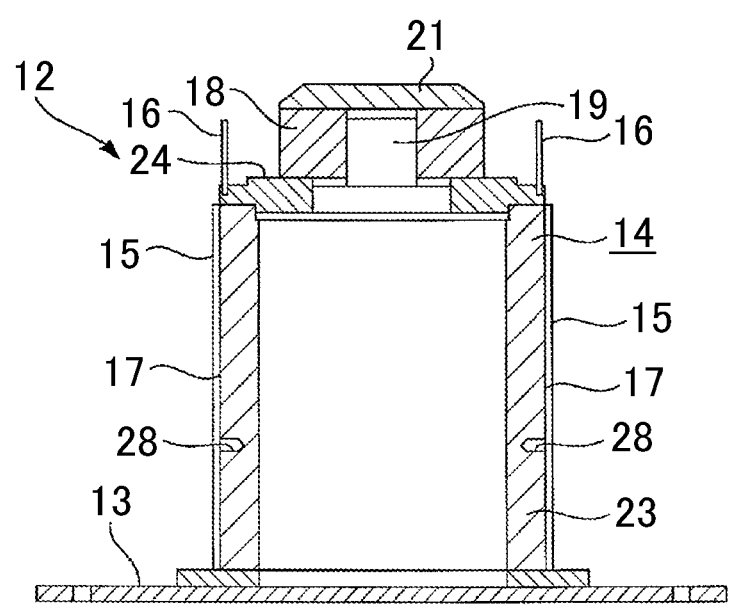

The U-phase coil 4U will be representatively described below. As shown in FIG. 2, the coil 4U is formed so as to occupy adjacent two slots 5, 5, where adjacent two slots 5, 5 that are located closer to each other, and adjacent two slots 5, 5 that are located farther from each other, are connected to each other with a predetermined gap therebetween by two coil sets 4U1, 4U2, and the two sets of coils 4U1, 4U2 are alternately connected. Each coil set 4U1, 4U2 is formed by slot conductor portions 11, a one end-side coil end portion 8 (the upper coil end portion in FIG. 2), and the other end-side coil end portion 10 (the lower coil end portion in FIG. 2). The slot conductor portions 11 are respectively disposed in the slots 5. The one end-side coil end portion 8 protrudes from the one end face 7 of the stator core 2, and is bent in an inner diameter direction R1 and extends in a circumferential direction M so as to connect to the slot conductor portions 11 located at a predetermined distance. The other end-side coil end portion 10 protrudes from the other end face 9 of the stator core 2, and extends in the circumferential direction M so as to connect to the slot conductor portions 11 located at a predetermined distance. The coil end portions 8, 10 are bent at a plurality of positions in the circumferential direction (e.g., Y) or the axial direction (e.g., X) so that the coil end portions 8, 10 are arranged without interfering with each other in the axial direction L or the radial direction R.

Each rectangular wire W of the above coil 4 has a plurality of linear portions 32, a plurality of continuous portions 33a, 33b, and a plurality of bent portions 34, and is entirely formed in a substantially cylindrical shape. The linear portions 32 correspond to the slot conductor portions 11 described above, and are respectively disposed in the slots 5 of the stator core 2. The linear portions 32 are formed parallel to the respective slots 5. The continuous portions 33a, 33b alternately connect one ends of adjacent ones of the linear portions 32 and the other ends thereof to each other. The continuous portions 33a, 33b are bent at right angle from ends of the linear portions 32. The bent portions 34 are formed by bending one end side of the linear portions 32 radially inward. The continuous portions 33a, 33b and the bent portions 34 correspond to the coil end portions 8, 10 described above.

Thus, one ends of the bent portions 34 are connected by the continuous portions 33a on one end side, and the continuous portions 33a are located radially inside the linear portions 32. On the other hand, the continuous portions 33b on the other end side are located on the circumference connecting the linear portions 32, or located radially outside the linear portions 32.

A stator manufacturing apparatus 12 for disposing the coil 4 described above in the stator core 2 will be described with reference to FIGS. 3 through 6. The manufacturing apparatus 12 is formed by fixing an insertion jig 14 on a substrate 13. The insertion jig 14 is made of a sufficiently rigid material such as, stainless steel. The insertion jig 14 is entirely formed in a substantially cylindrical shape, so that the rectangular wires W, which form the windings (the magnet wires 3) of the coil 4 described above, are axially detachable from the insertion jig 14 (see FIGS. 5 through 15 described below). The insertion jig 14 includes: a plurality of protrusions 15 respectively provided at a plurality of positions on an outer peripheral surface of the insertion jig 14 so as to protrude radially; and protruding pins 16 as one end-side restricting members, which are provided at the positions offset from the protrusions 15 formed in the circumferential direction, and protrude toward one axial end side (the upper side in FIGS. 3B, 4B, 5B, and 6).

The protrusions 15 are respectively positioned so as to align with the slots 5 of the stator core 2 to be inserted. Thus, the number of protrusions 15 is the same as that of the slots 5, and the protrusions 15 are arranged in phase with the slots 5 in the circumferential direction. Each protrusion 15 has a rectangular cross section in the direction perpendicular to the axial direction, along the entire axial length (the entire vertical length in FIGS. 3B, 4B, 5B, and 6) of the insertion jig 14. The orientation of the side surface on the outer diameter side of each protrusion 15 corresponds to the direction in which the slots 15 are formed. That is, since the slots 5 are formed in the radial direction of the stator core 2, the side surface on the outer diameter side of each protrusion 15 is perpendicular to the radial direction. Note that it is preferable to make the side surfaces on the outer diameter side of the protrusions 15 (the outer peripheral surfaces of the protrusions 15) smoother than the surfaces of the slots 5 of the stator core 2 by reducing the surface roughness or the like, in order to facilitate attaching and detaching of the linear portions 32 of the rectangular wires W as described below.

The amount by which the protrusions 15 protrude is slightly larger than the diameter of an inscribed circle of the teeth 6 of the stator core 2. As described below, the radially innermost one of the rectangular wires W disposed to overlap each protrusion 15 is disposed so that the radial inner side surface of each linear portion 32 of the innermost rectangular wires W is positioned radially outside the tip end face of each tooth 6 when the radially innermost rectangular wire W is disposed in the corresponding one of the slots 5. Thus, for example, a magnetic wedge is disposed in an opening of each slot 5, and the creepage distance between each linear portion 32 and the tip end face of each tooth 6 is ensured. Thus, the amount by which each protrusion 15 protrudes is adjusted according to the respective radial positions of the radially innermost rectangular wires W in the slots 5. The circumferential width of the protrusions 15 is slightly smaller than that of the slots 5.

Moreover, recesses 17 are formed in the portions of the outer peripheral surface of the insertion jig 14 other than the protrusions 15. The diameter of a circumscribed circle of the bottom surfaces of the recesses 17 is slightly smaller than that of the inscribed circle of the teeth 6, and the circumferential width of the recesses 17 is slightly larger than that of the teeth 6, so that the teeth 6 can be respectively disposed in the recesses 17. Thus, since the protrusions 15 and the recesses 17 are formed on the outer peripheral surface of the insertion jig 14, the cylindrical center of the rectangular wires W that are formed in a cylindrical shape can be accurately aligned with the cylindrical center of the inner peripheral surface of the stator core 2 when the cylindrical rectangular wires W and the stator core 2 are disposed on the outer peripheral surface of the insertion jig 14. Thus, the rectangular wires W can be radially equally disposed in the respective slots 5 of the stator core 2.

The protruding pins 16 are disposed on the inner diameter side of the inscribed circle of the teeth 6 on one axial end face of the insertion jig 14. That is, the protruding pins 16 are positioned so as to be aligned with the recesses 17, respectively, so that a circumscribed circle of the protruding pins 16 has the same diameter as, or a smaller diameter than, that of an inscribed circle of the bottom surfaces of the recesses 17. Moreover, as shown in FIGS. 11 through 15 described below, the amount by which the protruding pins 16 protrude in the axial direction is determined so that the protruding pins 16 axially protrude from the overall height (the axial height) of the bent portions 34 of the rectangular wires W that axially overlap with each other when the coil 4 is formed by disposing all the rectangular wires W on the insertion jig 14. Note that, in the present embodiment, the amount by which the protruding pins 16 protrude is determined in view of a portion for fixing guide members 29, as described below.

In the present embodiment, the diameter of each protruding pin 16 is smaller than the circumferential width of each recess 17. Thus, each protruding pin 16 is shifted toward one side from the central position in the circumferential direction of the corresponding recess 17, so that the circumferential side surface of each bent portion 34 of each rectangular wire W contacts, or is located close to, the corresponding protruding pin 16 when the rectangular wires W are attached to the insertion jig 14. For example, each protruding pin 16 is shifted counterclockwise in FIG. 3A from the central position in the circumferential direction of each recess 17, so that the counterclockwise side of the outer peripheral surface of each protruding pin 16 contacts, or is located close to, the side surface on the clockwise side of a corresponding protrusion 15 in FIG. 3A. Note that members having the same width as the circumferential with of the teeth 6 may be provided instead of the protruding pins 16.

Moreover, an axially protruding cylindrical portion 18 is fixed at the center of one axial end face of the insertion jig 14. That is, the inner peripheral surface of the protruding cylindrical portion 18 is fitted onto a columnar portion 19 provided at the center of one axial end face of the insertion jig 14, and the protruding cylindrical portion 18 and one axial end face of the insertion jig 14 are fixed together with bolts or the like. The diameter of the outer peripheral surface of the protruding cylindrical portion 18 is the same as, or slightly smaller than, the diameter of an inscribed circle of the one end-side coil end portion 8 of the coil 4 (an inscribed circle of the radially innermost continuous portions 33a). Thus, as described below, the radial position of one end side of the rectangular wires W is restricted when the rectangular wires W forming the coil 4 is attached to the insertion jig 14. Note that a guide plate 21, whose outer peripheral surface has a partially conical shape, is fixed to one end face of the protruding cylindrical portion 18 with bolts or the like. One end side of the rectangular wires W is guided to a predetermined position by the outer peripheral surface of the guide plate 21.

Note that, in the illustrated example, the insertion jig 14 is formed by fixing a cylindrical main body portion 23, having the protrusions 15 formed on an outer peripheral surface thereof, and a lid portion 24 for fixing the protruding cylindrical portion 18, with bolts or the like. However, the cylindrical main body portion 23 and the lid portion 24 may be formed integrally. Alternatively, the members 23, 24, 18 may be formed integrally.

Fitting holes 28 into which pins 27, which are the other end-side restricting members described below, are fixedly fit (see, e.g., FIG. 6), respectively, are formed in the other axial end-side portion of the outer peripheral surface of the insertion jig 14 at positions aligned with the recesses 17. As described below, the axial positions at which the pins 27 are fixed (that is, the axial positions of the fitting holes 28) are located on the other end side of the other end face 9 of the stator core 2 when the stator core 2 is disposed on the insertion jig 14, and located on one end side of the continuous portions 33b on the other end side of the rectangular wires W, when the rectangular wires W are disposed on the insertion jig 14. Each fitting hole 28 has a bottomed cylindrical shape, and fixes the corresponding pin 27 by interference fit. It should be noted that the interference is made small in order to facilitate attaching and detaching of the pins 27. Note that the diameter of the pins 27 is the same as, or smaller than, the circumferential width of the recesses 17.

Figure 4A:
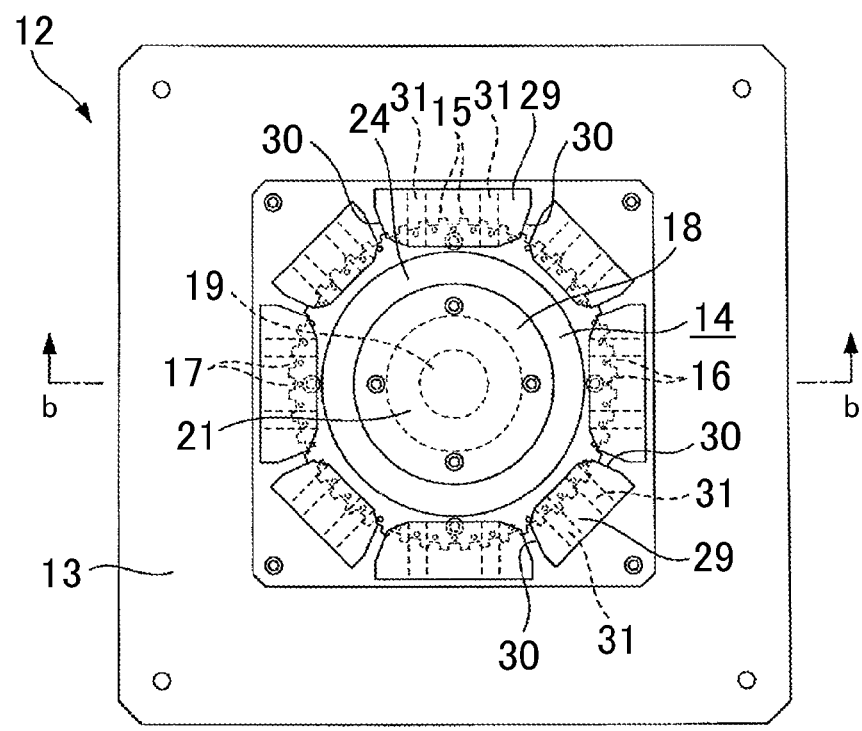
FIGS. 4A and 4B show a plan view and a b-b sectional view, showing a structure in which guide members are provided in the structure shown in FIGS. 3A and 3B.
Figure 4B:
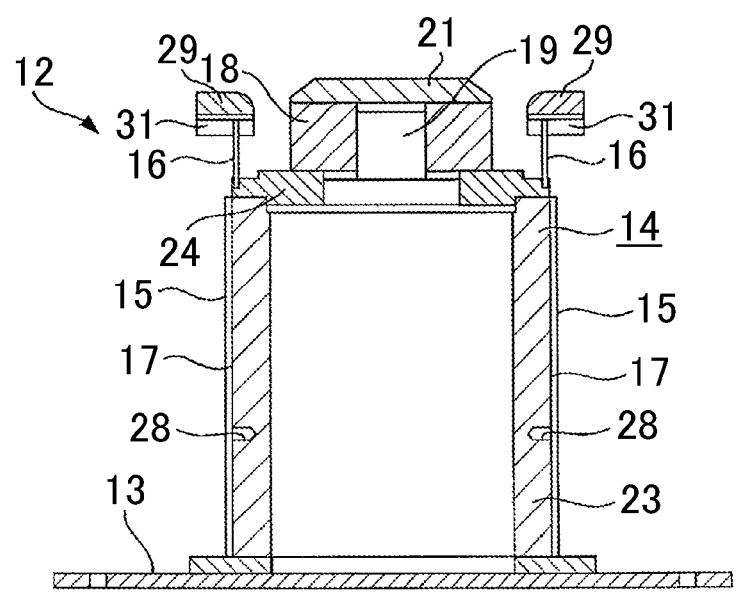

As shown in FIGS. 4A and 4B, the guide members 29 are positioned at a plurality of positions on one axial end side of the insertion jig 14. As shown in FIG. 4A, eight guide members 29 are arranged adjacent to each other in the circumferential direction of the insertion jig 14. Each guide member 29 has tilted surfaces 30 on both sides in the circumferential direction, so that the circumferential width of the guide member 29 is reduced toward the inner diameter side when the guide member 29 is disposed. As shown in FIG. 4B, the inner diameter-side side surface and the one axial end face of each guide member 29 are connected together by an arc. As described below, when being attached to the insertion jig 14, the rectangular wires W are guided by the tilted surfaces 30.

Positioning protrusions 31 are formed at two positions on the other axial end face of each guide member 29 so as to protrude toward the other axial side. The circumferential width of each positioning protrusion 31 is substantially the same as the pitch of the protruding pins 16 in the circumferential direction. The guide members 29 are positioned in the circumferential direction by disposing the positioning protrusion 31 between the protruding pins 16. Moreover, bottomed cylindrical fitting holes for fixedly fitting the respective protruding pins 16 are provided at a plurality of positions in the other axial end face of each guide member 29. By fixedly fitting the tip ends of the protruding pins 16 in the fitting holes, the guide members 29 are fixed at predetermined positions of the insertion hole 14. Note that the interference between each fitting hole and each protruding pin 16 is also made small in order to facilitate attaching and detaching of the guide members 29. As described below, the rectangular wires W are attached to the insertion jig 14 by alternately repeating fixing of the guide members 29 at the positions corresponding to the insertion position of the rectangular wires W, and detaching of the guide members 29 that are deviated from the positions corresponding to the insertion position of the rectangular wires W.

Figure 6:
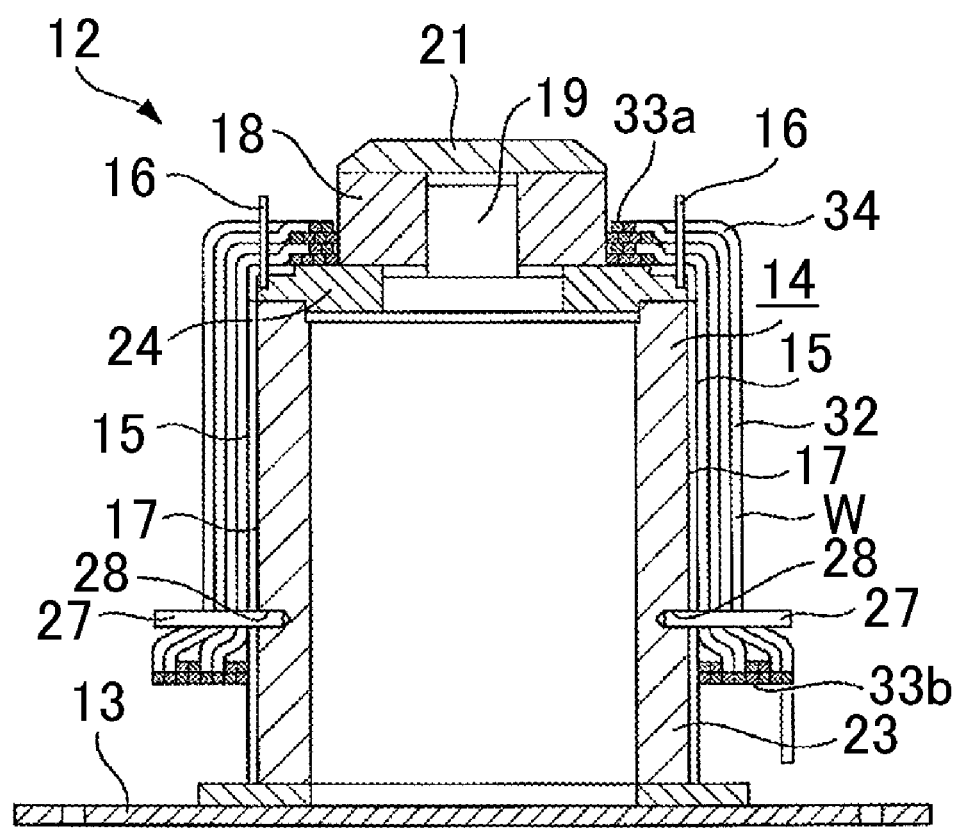
FIG. 6 is a diagram corresponding to the c-c sectional view of FIG. 5A, showing the state where the guide members have been removed, and pins as the other end-side restricting members have been attached.

As shown in FIGS. 5A and 5B, the rectangular wires W are sequentially attached to the above insertion jig 14 in a distributed winding arrangement. Then, as shown in FIG. 6, the guide members 29 are removed, and the pins 27 are fixedly fitted in the fitting holes 28, respectively. Thus, the circumferential position of one end side of the rectangular wires W is restricted by the protruding pins 16, the circumferential position of the other end side of the rectangular wires W is restricted by the pins 27, and the radial position of the rectangular wires W is restricted by the protrusions 15.

Now, the step of attaching the rectangular wires W forming the coil 4 to the insertion jig 14, and disposing the rectangular wires W in the stator core 2 will be described with reference to FIGS. 7 through 15. In the present embodiment, the rectangular wires W forming the coil 4 are cut at each round of wire. As shown in FIGS. 7 through 15, the resultant rectangular wires W are sequentially attached from one end side (the upper side in FIGS. 7 through 15) toward the other end side (the lower side of FIGS. 7 through 15) of the insertion jig 14 in the axial direction.

Figure 7:
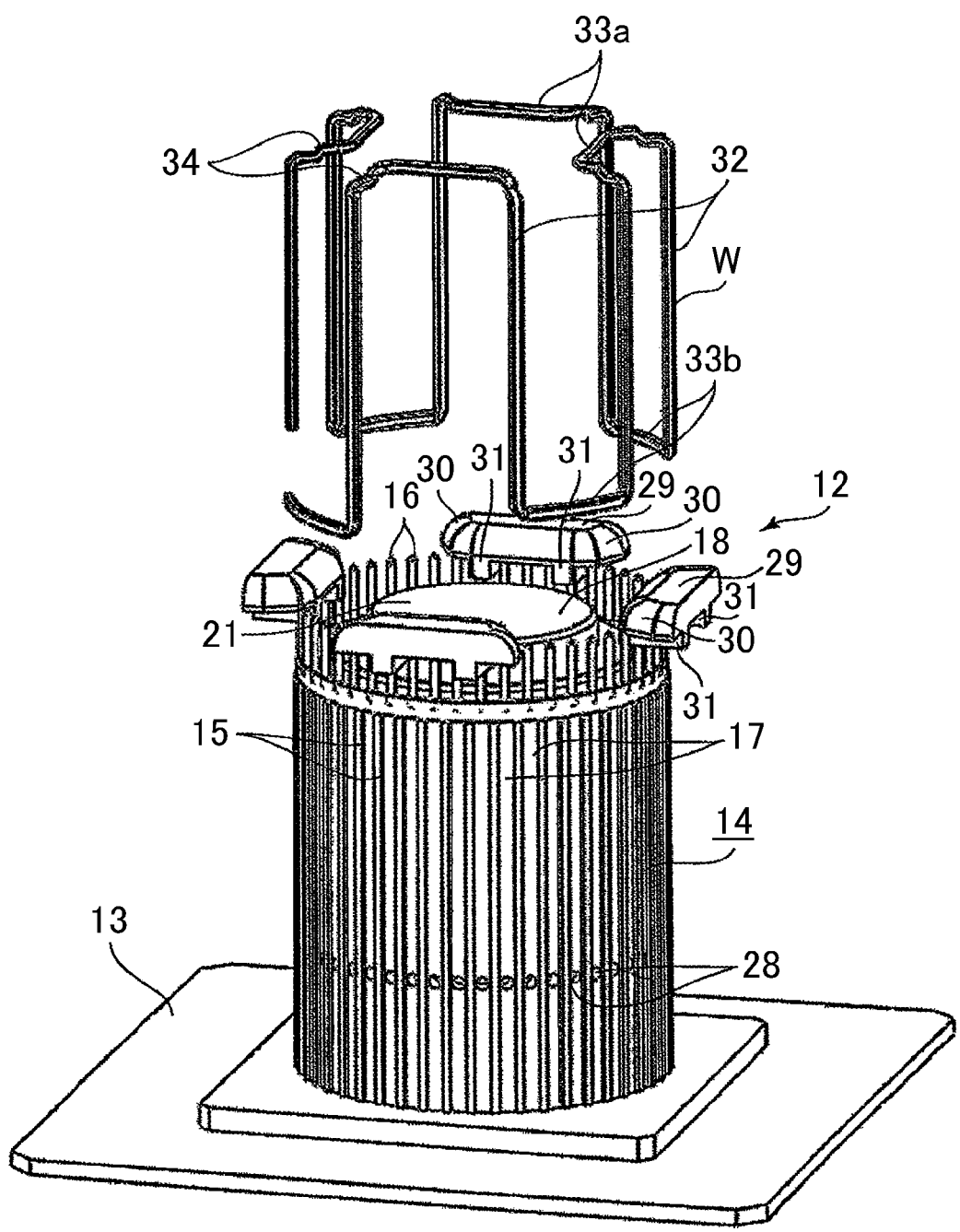
FIG. 7 is a perspective view illustrating a first step of a process of disposing a coil in a stator core by the stator manufacturing apparatus according to the embodiment of the present invention.

In order to sequentially attach such rectangular wires W to the insertion jig 14, as shown in FIG. 7, four guide members 29 are first disposed at predetermined positions on one end side of the insertion jig 14. Each guide member 29 is positioned so that the protrusions 15, on which the linear portions 32 of the rectangular wire W are to be disposed, are located on both sides of the guide member 29 in the circumferential direction, and so as to be phase-shifted in the circumferential direction from the continuous portions 33b on the other end side of the rectangular wire W. In other words, each guide member 29 is positioned so as to be in phase in the circumferential direction with the continuous portions 33a on one end side of the rectangular wire W.

Figure 8:
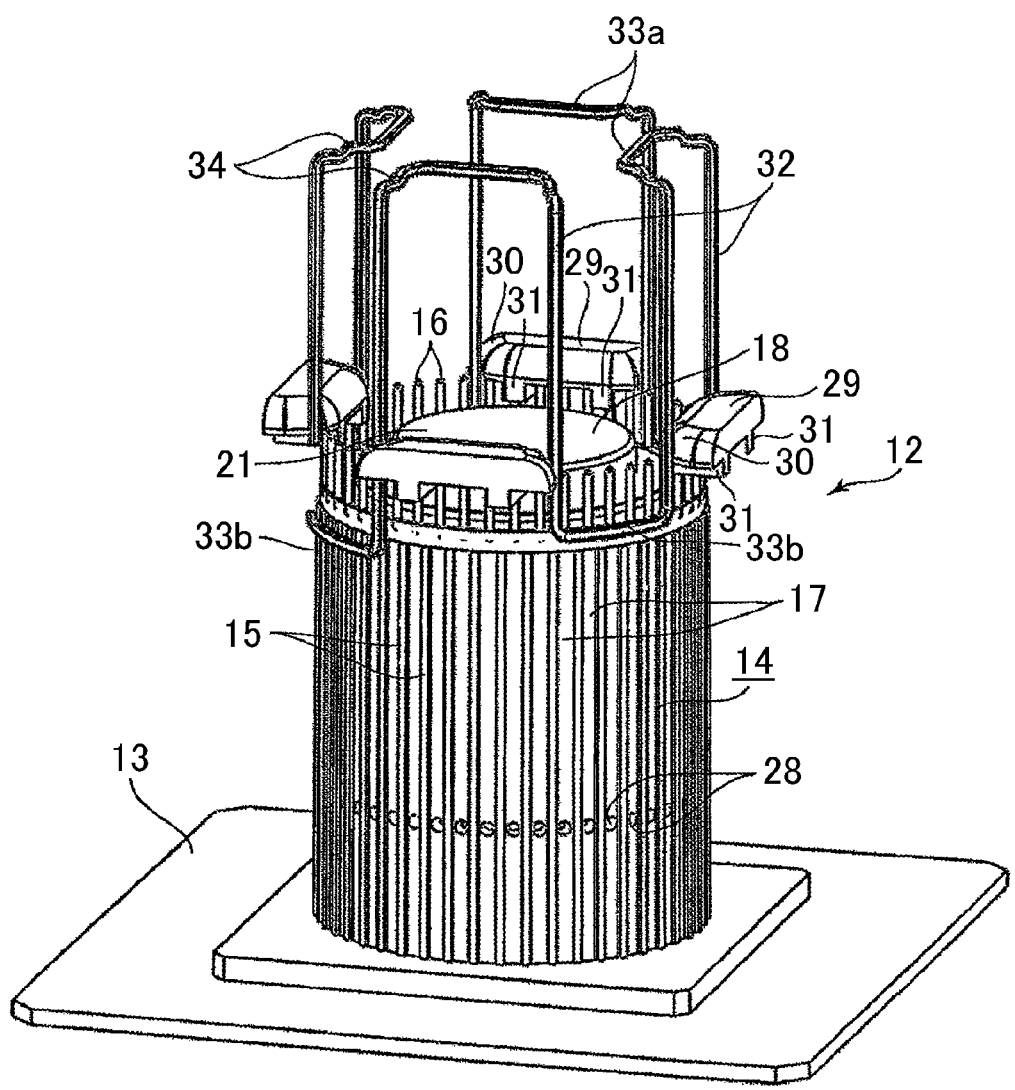
FIG. 8 is a perspective view showing a second step of the process.

As shown in FIG. 8, with each continuous portion 33b on the other end side of the rectangular wire W being positioned between the guide members 29, the rectangular wire W is moved axially from one end side toward the other end side of the insertion jig 14. At this time, the linear portions 32 are respectively guided by the tilted surfaces 30 of the guide members 29 so as to move on the side surfaces on the outer diameter side of the predetermined protrusions 15, whereby the linear portions 32 are disposed so as to radially overlap the side surfaces, respectively.

Figure 9:
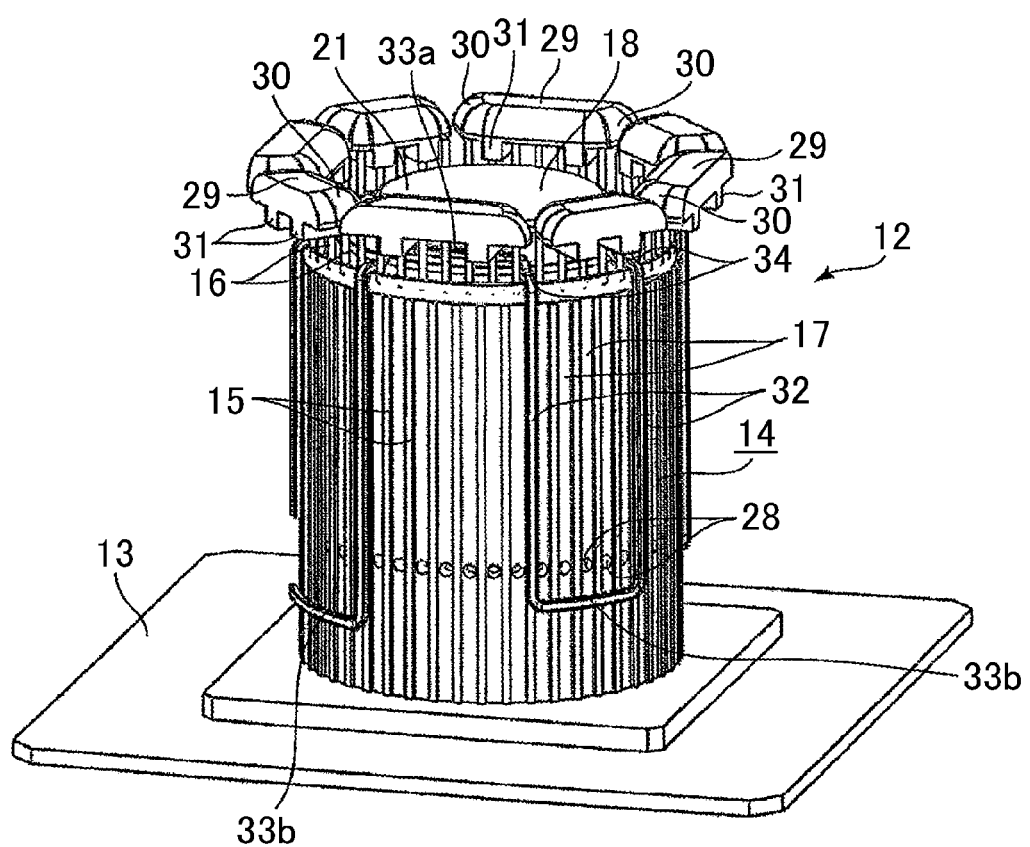
FIG. 9 is a perspective view showing a third step of the process.

Then, after the continuous portions 33b on the other end side pass the protrusion pins 16 provided on one end side of the insertion jig 14, the remaining four guide members 29 are disposed on one end side of the insertion jig 14, as shown in FIG. 9. Each of the remaining guide members 29 is also positioned so that the protrusions 15, on which the linear portions 32 are to be disposed, are located on both sides of the guide member 29. Thus, each linear portion 32 is positioned between the guide members 29, whereby the linear portions 32 are attached to the insertion jig 14 while being guided by the guide members 29. Then, the rectangular wire W is moved to a predetermined position on the insertion jig 14 so that each bent portion 34 is positioned between the protruding pins 16. Note that the rectangular wire W is attached to such a position on the insertion jig 14 that the bent portions 34 contact one end face of the insertion jig 14. That is, the axial position of the rectangular wire W with respect to the insertion jig 14 is restricted by bringing the bent portions 34 into contact with the one end face of the insertion jig 14.

After each bent portion 34 is positioned between the protruding pins 16, and the linear portions 32 are disposed so as to radially overlap the protrusions 15, respectively, the guide members 29 are removed from the insertion jig 14, as shown in FIG. 10.

Figure 11:
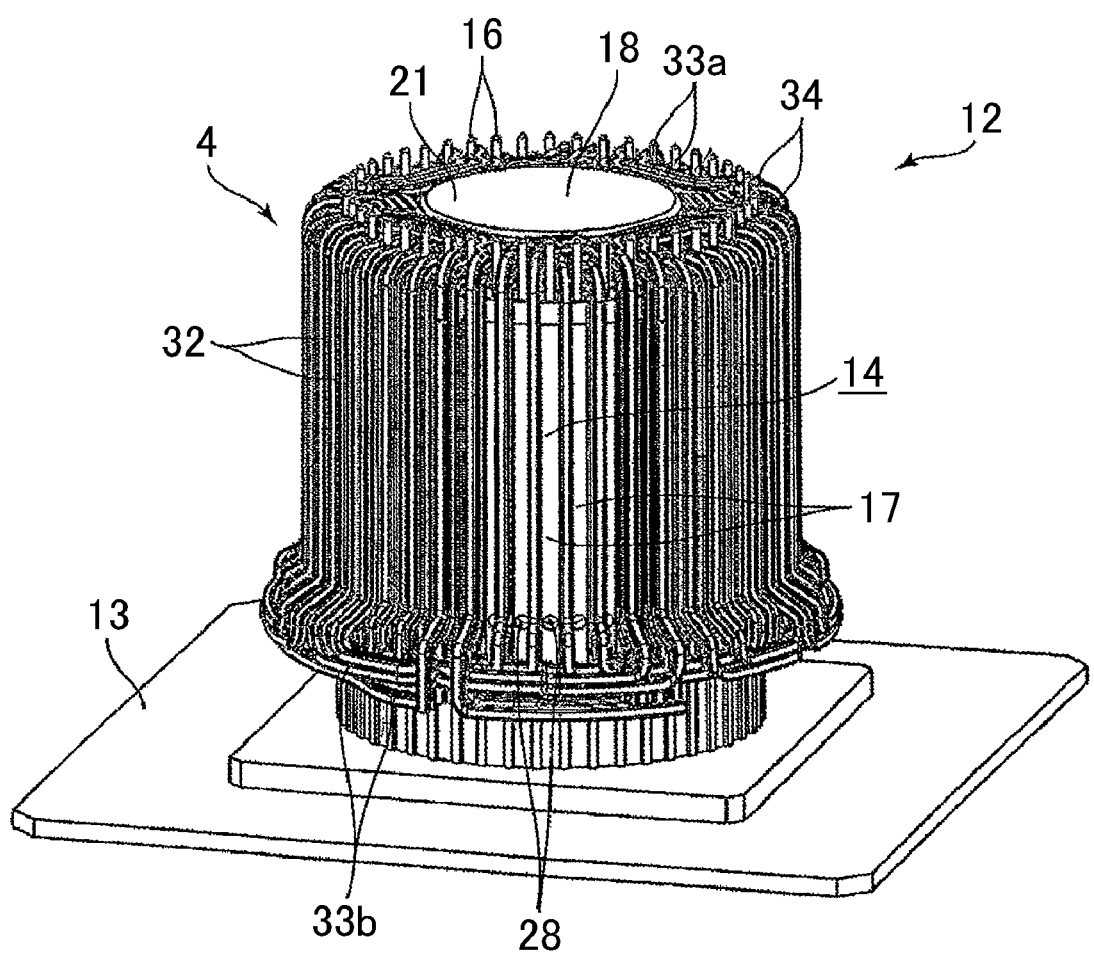
FIG. 11 is a perspective view showing a fifth step of the process.
Figure 12:
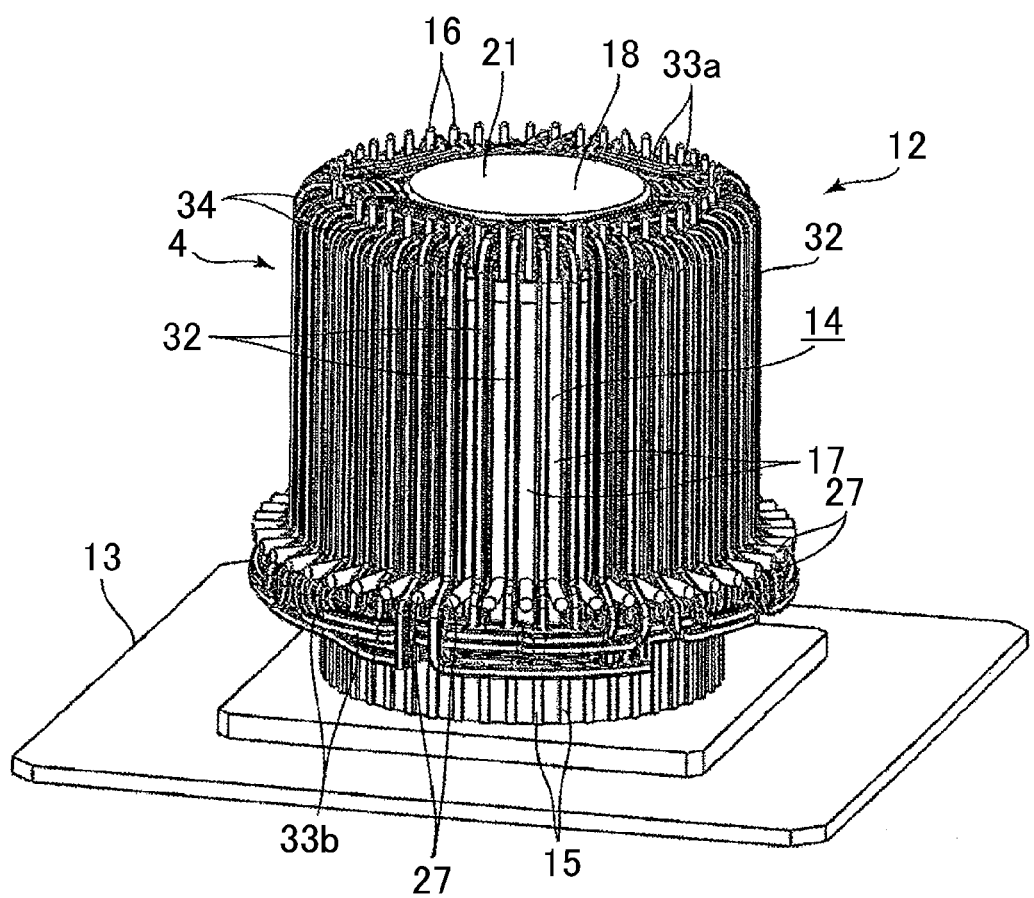
FIG. 12 is a perspective view showing a sixth step of the process.

The above operation is sequentially repeated for each rectangular wire W that forms the coil 4. At this time, the rectangular wire W to be attached next is disposed so that the side surfaces on the inner diameter side of the linear portions 32 of this rectangular wire W are placed on the side surfaces on the outer diameter side of the linear portions 32 of the previous rectangular wire W, respectively. Moreover, the positions of the guide members 29 are shifted according to the positions of the protrusions 15 on which the linear portions 32 are to be disposed, respectively. In this manner, as shown in FIG. 11, the rectangular wires W are disposed on the insertion jig 14 in a distributed winding arrangement, thereby forming the U-phase, V-phase, and W-phase coils 4. Then, as shown in FIG. 12, the pins 27 are fixedly fitted in the fitting holes 28 formed in the recesses 17 of the outer peripheral surface on the other end side of the insertion jig 14, respectively. Thus, the other axial end side of each linear portion 32 is positioned between the pins 27, whereby the circumferential position of the other axial end side of each linear portion 32 is restricted.

Figure 13:
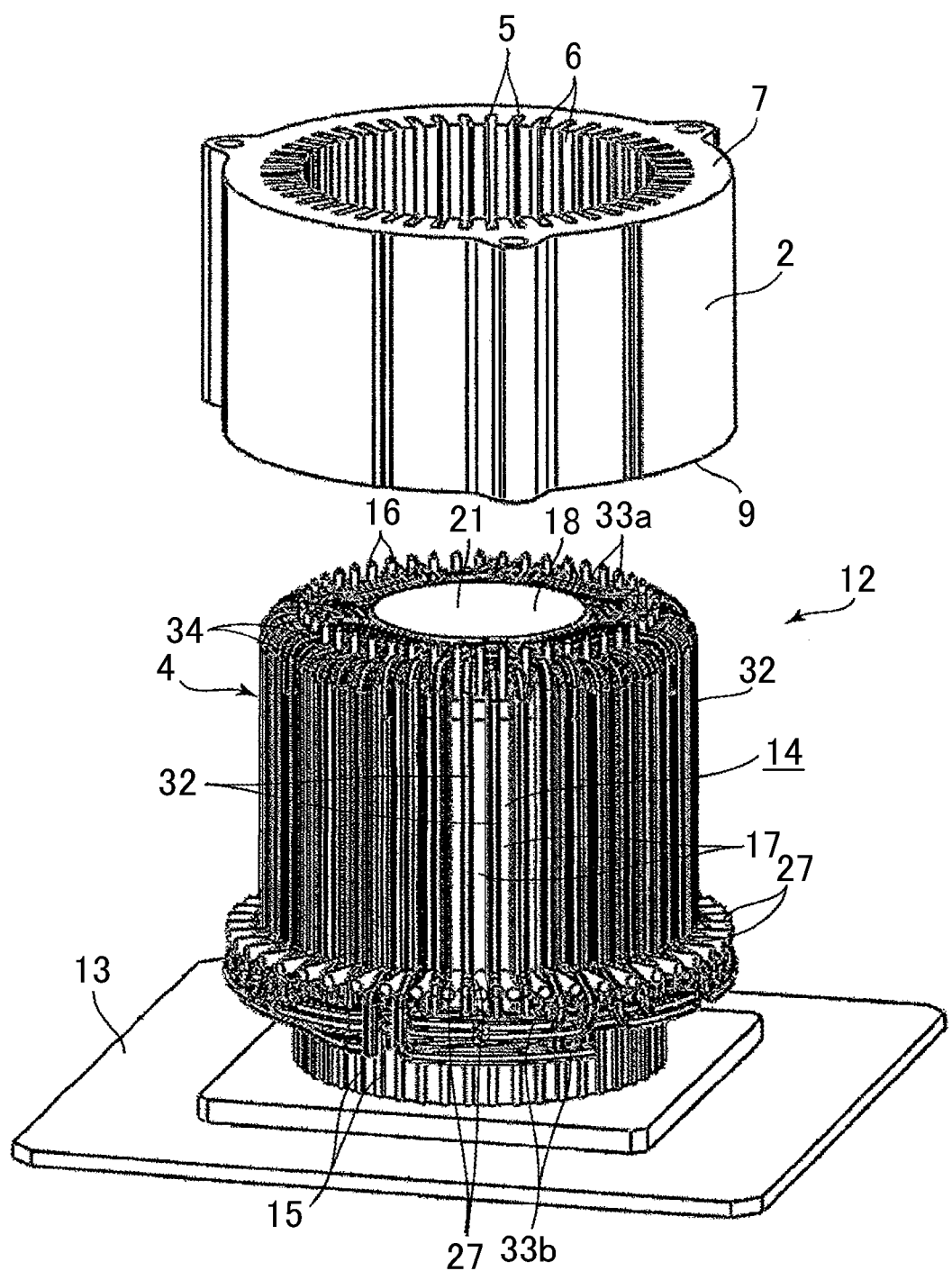
FIG. 13 is a perspective view showing a seventh step of the process.
Figure 14:
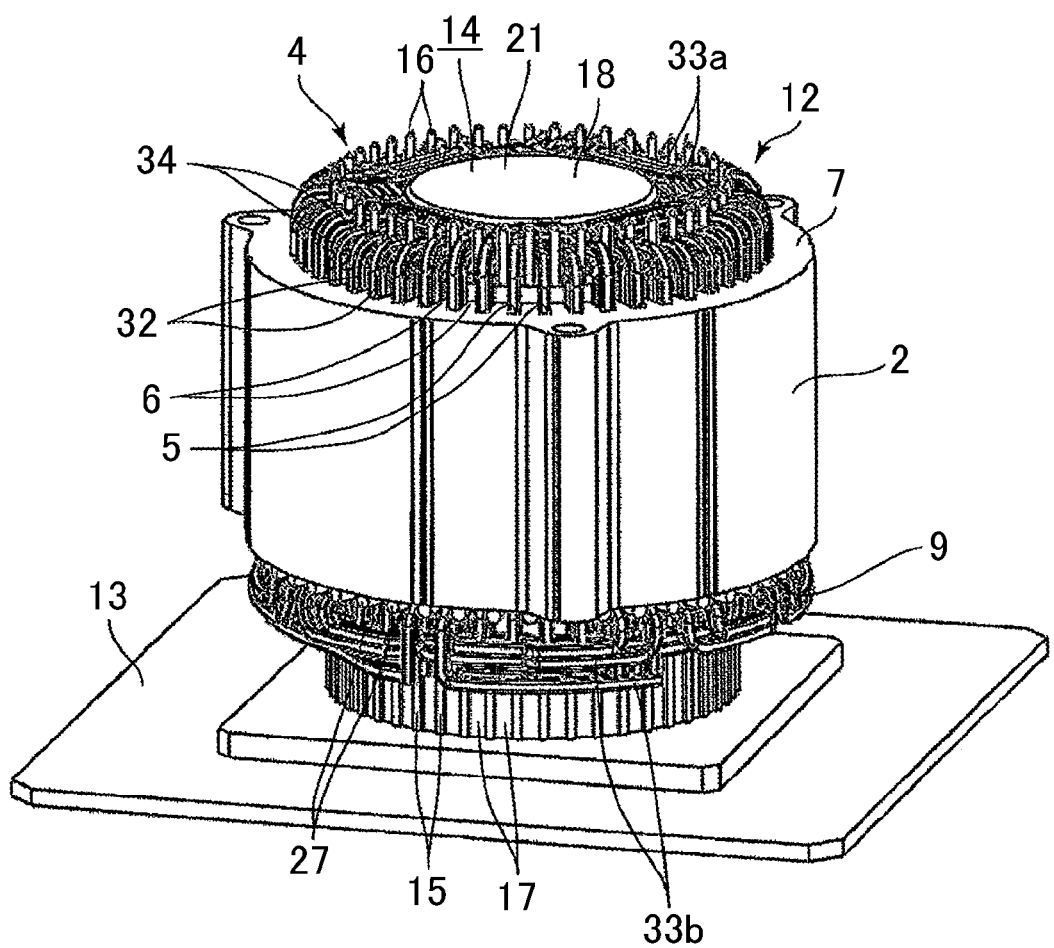
FIG. 14 is a perspective view showing an eighth step of the process.

In this state, as shown in FIG. 13, the stator core 2 is positioned on one end side of the insertion jig 14. With the linear portions 32 being aligned with the slots 5 of the stator core 2, respectively, the stator core 2 is moved from one end side toward the other end side of the insertion jig 14, whereby the stator core 2 is fitted on the insertion jig 14, as shown in FIGS. 13 and 14. In other words, the insertion jig 14 is inserted into the stator core 2 from one end side of the insertion jig 14. Then, the linear portions 32 are positioned in the slots 5, respectively.

Thereafter, as shown in FIG. 15, the pins 27 are removed from the insertion jig 14. Then, the stator core 2 is lifted, together with the coil 4 formed of the rectangular wires W, from the insertion jig 14 toward one end side. In other words, the insertion jig 14 is removed from the stator core 2 toward the other end side. Thus, the stator core 2 in which the coil 4 is disposed is separated from the insertion jig 14. As a result, the linear portions 32 are positioned at a predetermined position in the respective slots 5, whereby the stator 1 shown in FIG. 1 is obtained.

According to the above embodiment, the insertion jig 14 is axially inserted into the stator core 2 after the rectangular wires W are disposed on the insertion jig 14 in a distributed winding arrangement. Thus, the rectangular wires W can be easily disposed in the stator core 2 in a distributed winding arrangement. That is, the rectangular wires W are disposed in advance on the insertion jig 14 in a distributed winding arrangement. Moreover, the radial positions of the linear portions 32 to be inserted into the slots 5 are restricted by the protrusions 15, and the circumferential positions of the linear portions 33 are restricted by the protruding pins 16 and the pins 27. Thus, no linear portion 32 is displaced in the circumferential direction when axially inserting the insertion jig 14 into the stator core 2, whereby the linear portions 32 can be easily disposed at the predetermined radial positions of the slots 5, respectively.

In particular, the rectangular wires W have directionality, and the rectangular wires W can be placed only in a limited direction. Thus, the directionality of the linear portions 32 can be easily determined by placing the linear portions 32 on the protrusions 15. That is, since the rectangular wires W have a rectangular cross section, the direction of the linear portions 32 is naturally determined if the linear portions 32 are placed so that the side surfaces on the inner diameter side of the linear portions 32 contact the side surfaces on the outer diameter side of the protrusions 15, respectively. Moreover, the direction of the linear portions 32 to be disposed next is naturally determined if the rectangular wire W to be disposed next is placed so that the side surfaces on the inner diameter side of the linear portions 32 of this rectangular wire W contact the side surfaces on the outer diameter side of the linear portions 32 of the previous rectangular wire W, respectively. Thus, by aligning the orientation of the side surfaces on the outer diameter side of the protrusions 15 with the direction in which the slots 5 are formed, the direction of the linear portions 32 can be easily restricted, whereby the side surfaces of the linear portions 32 can be made parallel to the inner side surfaces of the slots 5.

Moreover, by restricting the radial positions of the linear portions 32 by the protrusions 15, the linear portions 32 can be easily disposed at predetermined positions of the slots 5 without protruding in the radial direction. Moreover, by using the bent portions 34, the circumferential positions of the linear portions 32 can be easily restricted by the protruding pins 16. That is, since the bent portions 34 are formed by bending one end side of the linear portions 32, the circumferential positions of the liner portions 32 can be easily restricted by restricting the circumferential positions of the bent portions 34. Note that, in the present embodiment, the insertion jig 14 is inserted into the stator core 2 from the one axial end side of the insertion jig 14. Thus, if the circumferential positions on one end side of the linear portions 32 are restricted in a manner similar to that of, e.g., the pins 27 on the other end side, the insertion jig 14 interferes with the stator core 2 upon insertion. Thus, a structure similar to that of the other end side cannot be used on one end side. On the other hand, by using the bent portions 34, the insertion jig 14 can be inserted without interfering with the stator core 2.

In the present embodiment, the circumferential positions on the other end side of the linear portions 32 are restricted by the pins 27. Thus, the circumferential positions of the linear portions 32 can be more reliably restricted along the axial direction, and the linear portions 32 and the slots 5 of the stator core 2 can be prevented from interfering with each other when inserting the insertion jig 14 into the stator core 2, thereby enabling smooth insertion. That is, the rectangular wires W are highly rigid in the circumferential direction due to the presence of the continuous portions 33a, 33b. Thus, if the linear portions 32 are tilted in the circumferential direction with respect to the slots 5, and are positioned in the slots 5 in the tilted state, the linear positions 32 do not easily restore from the tilted state. If the insertion is performed with the linear portions 32 being in the tilted state, the linear portions 33 and the slots 5 interfere with each other, which hinders smooth insertion, and can cause damage to the linear portions 32. On the other hand, in the present embodiment, the circumferential positions of the linear portions 32 are restricted both on one axial end side and the other axial end side. Thus, the linear portions 32 are less likely to be tilted, and the above problems are less likely to occur.

Moreover, the pins 27 are removed from the insertion jig 14 when removing the insertion jig 14 from the stator core 2. Thus, the continuous portions 33b on the other end side of the rectangular wires W do not interfere with the pins 27. Moreover, since the linear portions 32 and the bent portions 34 are guided to predetermined positions by the guide members 29, the rectangular wires W can be easily and reliably disposed on the insertion jig 14. That is, since the rectangular wires W are disposed while guiding each linear portion 32 between the guide members 29, the linear portions 32 can be easily made in phase with the protrusions 15 to which the linear portions 32 are to be disposed. Moreover, the linear portions 32 can be prevented from being tilted or the like, and thus being removed from the protruding portions 15 when disposing the rectangular wires W.

Note that the structure in which the insertion jig 14 is provided with the pins 27 as the other end-side restricting members and the guide members 29 is described in the above embodiment. However, at least one of the pins 27 and the guide members 29 may be omitted. The respective shapes of the protruding pins 16, the pins 27, and the guide members 29 are not limited to those in the structure shown in the above embodiment, and may be other shapes having similar effects. For example, the protruding pins 16 and the pins 27 may have a substantially rectangular shape, and the side surfaces thereof may extend along the side surfaces of the bent portions 34 or the side surfaces of the linear portions 32. Each rectangular wire W that forms the coil 4 may be a wire wound a plurality of rounds, or a wire wound less than a round, e.g., two third of a round. However, each rectangular wire W needs be a wire wound more than a half round so that the wire can be fitted on the insertion jig 14.

The stator manufacturing apparatus of the present invention can be used to manufacture stators of motors, and is especially preferable for a structure in which rectangular wires are disposed in a distributed winding arrangement, as in stators of motors for hybrid vehicles.

What is claimed is:

1. A stator manufacturing apparatus for manufacturing a stator, the stator manufacturing apparatus configured to be operatively associated with:
   a stator core having radial slots that are formed at a plurality of positions in a circumferential direction so as to open in an inner peripheral surface of the stator core; and
   a rectangular cross-section rectangular wire that is formed in a substantially cylindrical shape and forms a coil winding, and that has a plurality of linear portions that are respectively disposed in the slots and formed in parallel to the slots, a plurality of continuous portions that alternately connect one ends of the adjacent ones of the linear portions to each other and alternately connect the other ends thereof to each other, and a plurality of bent portions that are formed by bending one end side of the linear portions radially inward, wherein the rectangular wire is disposed on the stator core in a distributed winding arrangement, the stator manufacturing apparatus comprising:
   an insertion jig which is entirely formed in a substantially cylindrical shape, and from which the rectangular wire is axially detachable, wherein
   the insertion jig has protrusions that are respectively provided at a plurality of positions, which are aligned with the slots, on an outer peripheral surface of the insertion jig so as to protrude radially, and one end-side restricting members that are respectively provided at positions offset from the protrusions formed in the circumferential direction on an inner diameter side of an inscribed circle of teeth each located between adjacent ones of the slots of the stator core so as to protrude toward one axial end side,
   radial positions of the linear portions are restricted by disposing the rectangular wire from one end side of the insertion jig and disposing the linear portions so as to radially overlap the protrusions, respectively, and circumferential positions of the linear portions are restricted by disposing each of the bent portions between the one end-side restricting members, and
   with the linear portions and the slots being aligned with each other, the insertion jig is inserted into the stator core from the one end side of the insertion jig, and is removed from the stator core toward the other end side, so as to respectively dispose the linear portions at predetermined positions in the slots.

2. The stator manufacturing apparatus according to claim 1, wherein
   the insertion jig includes other end-side restricting members, which are detachably provided at positions offset from the protrusions on an outer peripheral surface of the other axial end side of the insertion jig so as to protrude radially, and
   after the rectangular wire is disposed on the insertion jig, the other end-side restricting members are attached to the insertion jig, the insertion jig is inserted into the stator core with the respective circumferential positions on the other end side of the linear portions being restricted by the other end-side restricting members, the other end-side restricting members are removed from the insertion jig, and then, the insertion jig is removed from the stator core.

3. The stator manufacturing apparatus according to claim 1, further comprising:
   a guide member provided on one axial end side of the insertion jig so as to guide each of the linear portions to a predetermined one of the protrusions and guide each of the bent portions between predetermined ones of the one end-side restricting members.

* * * * *